(12) United States Patent
Laine et al.

(10) Patent No.: US 12,270,697 B2
(45) Date of Patent: Apr. 8, 2025

(54) METHOD FOR DETERMINING A MASS PROPERTY OF A VEHICLE

(71) Applicant: VOLVO TRUCK CORPORATION, Gothenburg (SE)

(72) Inventors: Leo Laine, Härryda (SE); Leon Henderson, Härryda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 140 days.

(21) Appl. No.: 17/435,984

(22) PCT Filed: Mar. 7, 2019

(86) PCT No.: PCT/EP2019/055766
§ 371 (c)(1),
(2) Date: Sep. 2, 2021

(87) PCT Pub. No.: WO2020/177871
PCT Pub. Date: Sep. 10, 2020

(65) Prior Publication Data
US 2022/0155130 A1    May 19, 2022

(51) Int. Cl.
*G01G 19/02*    (2006.01)
(52) U.S. Cl.
CPC .................. *G01G 19/021* (2013.01)
(58) Field of Classification Search
CPC .................................................. G01G 19/021
See application file for complete search history.

(56) References Cited

U.S. PATENT DOCUMENTS

| | | | |
|---|---|---|---|
| 5,136,513 A | 8/1992 | Sol et al. | |
| 7,198,227 B2* | 4/2007 | Olin | G06Q 10/08 244/137.1 |
| 10,139,265 B2* | 11/2018 | Fuss | G06K 7/1413 |
| 2006/0076741 A1* | 4/2006 | Lim | B60G 17/0162 280/5.508 |
| 2006/0085112 A1* | 4/2006 | Lu | B60G 17/016 701/38 |
| 2009/0105874 A1 | 4/2009 | Tietjen et al. | |
| 2009/0105875 A1 | 4/2009 | Wiles | |

(Continued)

FOREIGN PATENT DOCUMENTS

| | | |
|---|---|---|
| CN | 103129560 A | 6/2013 |
| CN | 104748832 A | 7/2015 |

(Continued)

OTHER PUBLICATIONS

Machine translation of JP-H1183534 (Year: 1999).*

(Continued)

*Primary Examiner* — Natalie Huls
(74) *Attorney, Agent, or Firm* — Venable LLP; Jeffri A. Kaminski (57) ABSTRACT

A method for determining a mass property of a land-based vehicle for cargo transport. The method comprises registering one or more properties of a cargo unit entering the vehicle, wherein at least one of the properties is related to a mass of the cargo unit, estimating a location of the cargo unit in the vehicle, and determining at least one vehicle mass property of the vehicle based on the one or more registered properties and on the estimated location of the cargo unit.

24 Claims, 4 Drawing Sheets

(56) References Cited

U.S. PATENT DOCUMENTS

| | | |
|---|---|---|
| 2009/0319165 A1 | 12/2009 | Eadie |
| 2010/0198491 A1 | 8/2010 | Mays |
| 2012/0265401 A1 | 10/2012 | Stuetzler et al. |
| 2017/0315014 A1* | 11/2017 | Regan ..................... B64D 45/00 |
| 2017/0351268 A1 | 12/2017 | Anderson et al. |
| 2018/0111698 A1* | 4/2018 | Podnar ................. G06Q 10/043 |
| 2019/0056736 A1 | 2/2019 | Wood et al. |
| 2020/0023811 A1* | 1/2020 | Herman .................. B60R 25/01 |
| 2022/0136889 A1* | 5/2022 | Zack .................... B60G 17/017 |
| | | 701/37 |
| 2022/0219691 A1* | 7/2022 | Maleki ................. G06F 11/079 |

FOREIGN PATENT DOCUMENTS

| | | | |
|---|---|---|---|
| EP | 2511149 | A2 | 10/2012 |
| JP | S54104181 | A | 8/1979 |
| JP | H1183534 | A * | 3/1999 |
| JP | H11278799 | A | 10/1999 |
| JP | 2001097072 | A | 4/2001 |
| JP | 2007216747 | A | 8/2007 |
| JP | 2009227265 | A | 10/2009 |
| JP | 2009250747 | A | 10/2009 |
| JP | 2010253978 | A | 11/2010 |
| JP | 2012218736 | A | 11/2012 |
| JP | 2014046764 | A | 3/2014 |
| JP | 2017101987 | A | 6/2017 |
| JP | 2018022934 | A | 2/2018 |
| SE | 1650520 | A1 | 10/2017 |
| WO | 2013124103 | A1 | 8/2013 |
| WO | 2014096455 | A1 | 6/2014 |
| WO | 2018047223 | A1 | 3/2018 |
| WO | WO-2020242361 A1 * | 12/2020 | ............ B60K 28/08 |

OTHER PUBLICATIONS

Chinese Office Action dated Nov. 30, 2022 in corresponding Chinese Patent Application No. 201980093392.1, 10 pages.

International Search Report and Written Opinion dated Nov. 8, 2019 in corresponding International PCT Application No. PCT/EP2019/055766, 10 pages.

International Preliminary Report on Patentability dated May 12, 2021 in corresponding International PCT Application No. PCT/EP2019/055766, 16 pages.

Japanese Office Action dated Apr. 28, 2023 in corresponding Japan Patent Application No. 2021-552957, 9 pages.

Chinese Office Action dated Nov. 30, 2023 in corresponding Chinese Patent Application No. 201980093392.1, 8 pages.

Japanese Notice of Allowance dated Dec. 22, 2023 in corresponding Japanese Patent Application No. 2021552957, 4 pages.

\* cited by examiner

METHOD FOR DETERMINING A MASS PROPERTY OF A VEHICLE

CROSS-REFERENCE TO RELATED APPLICATIONS

This application is a U.S. National Stage application of PCT/EP2019/055766, filed Mar. 7, 2019, and published on Sep. 10, 2020, as WO 2020/177871 A1, all of which is hereby incorporated by reference in its entirety.

TECHNICAL FIELD

The present disclosure relates to methods, control units, and systems for determining mass properties and vehicle dynamics associated with land-based vehicles for cargo transport, such as trucks and semi-trailers.

The invention can be applied in heavy-duty vehicles, such as trucks and construction equipment. Although the invention will be described mainly with respect to a semi-trailer vehicle and a tractor-semi-trailer combination, the invention is not restricted to this particular vehicle, but may also be used in other vehicles such as different types of trucks, trailers, forklifts and also in shipping containers.

BACKGROUND

A vehicle negotiating a curve or executing a rapid maneuver may lose control or even tip over in cases when the velocity is too high during the maneuver. A tip-over type of event is known as vehicle roll-over. Events where vehicle control is lost includes, e.g., trailer swing-out and jackknifing which refers to an uncontrolled folding of an articulated vehicle so that it resembles the acute angle of a folding pocket knife. A limit speed, or roll-over threshold, can be determined based on known mechanical relationships between vehicle mass, vehicle velocity, and forces acting on the vehicle. As long as the vehicle is operated below the roll-over limit speed for a given situation, safe driving conditions are ensured.

US2010198491 discloses a vehicle safety system which considers vehicle dynamics when detecting potentially dangerous situations, e.g., when entering a curve at too high velocity while at the same time having a high center of gravity in the vehicle.

A problem with cargo transport vehicles when it comes to determining roll-over thresholds and the like is that the mass properties, like the center of gravity (COG) location, of the vehicle changes with cargo. For instance, a vehicle carrying a light load is less susceptible to vehicle roll-over compared to a vehicle which is heavily loaded, especially if the height of the load in the cargo hold is substantial.

Problems associated with roll-over and vehicle stability during rapid maneuvers become more pronounced in autonomous or semi-autonomous vehicles, where a driver is not present to take corrective action. These vehicles may need to be configured with large safety margins when it comes to roll-over thresholds due to uncertainties in vehicle mass properties such as COG location.

Consequently, there is a need for efficient and reliable methods to determine mass properties of cargo transport vehicles. There is also a need for improved methods to determine limiting speeds during rapid vehicle maneuvers.

SUMMARY

It is an object of the present disclosure to provide improved methods for determining a mass property of a cargo transport vehicle. This object is at least in part obtained by a method for determining a mass property of a land-based cargo transport vehicle. The method comprises registering one or more properties of a cargo unit entering the vehicle, wherein at least one of the properties is related to a mass of the cargo unit. The method also comprises estimating a location of the cargo unit in the vehicle and determining the mass property of the vehicle based on the one or more registered cargo unit properties and on the estimated location of the cargo unit.

This way the mass property of the vehicle is updated as cargo enters the vehicle. By keeping track of properties of the cargo entering the vehicle, and where the cargo is placed, a robust and reliable estimate of vehicle mass properties can be obtained including effects from cargo. Advantageously, vehicle dynamics such as roll-over thresholds and the like may be determined based on the up-to-date mass properties, resulting in a more secure vehicle operation. Safety margins can likely be reduced in autonomous vehicles due to the improved information on vehicle mass, resulting in a more efficient operation.

According to aspects, the method further comprises determining a vehicle dynamic property and/or a vehicle static property based on the determined vehicle mass property.

Thus, vehicle capabilities such as maximum velocities, maximum turn rates, roll-over thresholds, and the like can be communicated to vehicle control systems for autonomous driving and/or to a driver of the vehicle. This way more refined information about vehicle capabilities are obtained, which is an advantage.

According to some such aspects, the vehicle dynamic property comprises any of; a moment of inertia of cargo and/or vehicle in yaw direction, a moment of inertia of cargo and/or vehicle in roll direction, a moment of inertia of cargo and/or vehicle in the pitch direction, a steady state rollover lateral acceleration limit, i.e., when a gravity force points outside an inner wheel, and a limiting speed for a vehicle when negotiating a curve and/or executing a rapid maneuver. Consequently, there is provided herein a robust and efficient method for estimating vehicle dynamic characteristics such as inertia values based on current cargo configuration.

According to other such aspects, the vehicle static property comprises any of; a static rollover angle threshold, a vehicle stability value, and an expected axle load distribution. Consequently, there is provided herein a robust end efficient method for estimating vehicle static characteristics based on current cargo.

According to aspects, the registering and/or the estimating comprises estimating physical dimensions and mass of the cargo unit. By obtaining information related to dimension and mass for each cargo unit, a more refined estimate of vehicle mass property can be obtained, which is an advantage.

According to aspects, the registering and/or the estimating comprises registering and/or estimating by a sensor unit arranged separated, i.e., away, from a door of the land-based cargo transport vehicle, whereby the registering and/or the estimating can be performed during loading of the vehicle. It is an advantage that the sensor unit is not arranged on the door of the cargo transport vehicle, since the door is opened during loading and unloading of cargo. By arranging the sensor separated from the door, the sensor can be used for sensing during loading and unloading of the cargo transport vehicle, regardless of how the door is configured, which is an advantage.

According to aspects, the method also comprises registering one or more properties of a cargo unit leaving the vehicle and associating the unloaded cargo unit with a respective location in the vehicle. This way, advantageously, an up-to-date account of vehicle mass properties can be maintained even if individual cargo units are loaded and/or unloaded from the vehicle during a route, e.g., before an end stop of the route.

According to some aspects, the registering comprises associating an identity with the cargo unit based on any of; bar-code scanning, radio frequency identification, RFID, an infra-red label, a radar transponder, and manual input, and obtaining one or more properties of the cargo unit from a logistics database based on the identification. Information about individual parcels are often obtainable from a remote server. By identifying a parcel or cargo unit, such properties can be downloaded and associated with the cargo entering the vehicle. Information regarding, e.g., dimensions, weight, end destination, etc. are often obtainable from remote servers, which information can be used to refine the estimate of vehicle mass property. The remote server may be a third party remote server belonging to, e.g., a transport or logistics company, or it can be a proprietary remote server configured solely to support the present method.

According to other aspects, the registering comprises obtaining pre-configured cargo unit type data and/or pre-configured cargo unit mass data. For instance, it may be known a-priori which type of cargo that is about to enter the vehicle at each stop. Cargo properties can then be pre-configured beforehand, and stored in memory, which allows for an efficient and convenient obtaining of cargo properties as it enter the vehicle.

According to further aspects, the registering comprises recognizing a cargo type associated with the cargo unit based on any of a vision sensor, an X-ray sensor, and a radar sensor. This way cargo properties can be automatically inferred based on the recognized type of cargo, which is an advantage. Artificial intelligence routines can be employed to identify or classify cargo entering the vehicle based on prior training or configuration.

According to aspects, the registering comprises estimating a cargo type associated with the cargo unit based on a location of the cargo transport vehicle, and/or based on pre-configured route information associated with the cargo transport vehicle. In some situations, a type of cargo can be associated with a given location, e.g., the location of a particular warehouse or factory. Thus, by associating vehicle location with cargo type, a simplified but more efficient cargo type estimation can be achieved.

According to aspects, the method also comprises detecting a re-location or shift of one or more cargo units in the land-based cargo transport vehicle and updating the mass property based on the re-location or shift. These types of aspects may be especially applicable in case the cargo is re-arranged in the hold, following which the mass properties of the vehicle may need to be updated. These aspects are also applicable in order to detect unwanted shifts in cargo during driving, which may act detrimental to vehicle stability. Detecting shifting of cargo during driving, e.g., due to unsecured load, may also warrant notifying or warning the driver to prevent cargo damage and maintain safe driving conditions.

According to some aspects, the method comprises assessing an amount of free or occupied space available in the vehicle and determining if an additional cargo unit can fit in the cargo area based on the estimated space and on size of the cargo unit. This way vehicle operation and cargo transport can be made more efficient, which is an advantage.

There are also disclosed herein computer programs, computer readable mediums, control units, sensor units, and vehicles associated with the above-mentioned advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

Figure 1:
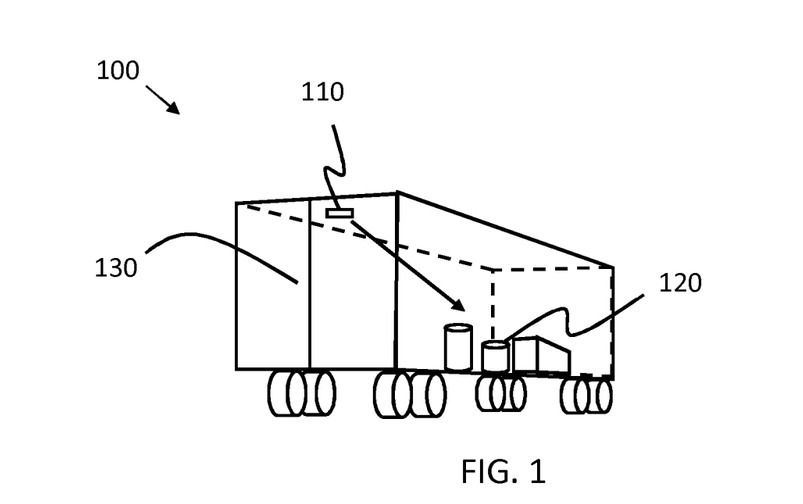
FIG. 1 schematically illustrates a vehicle for cargo transport.

FIG. 1 illustrates a land-based vehicle 100 arranged to transport cargo 120. The vehicle 100 is a trailer, although it is appreciated that the techniques disclosed herein can be used with a wide variety of different types of vehicles, like different types of trucks, rigid trucks, tipper trucks, forklifts, and the like. The disclosed techniques are also applicable for use with shipping containers.

Figure 2:
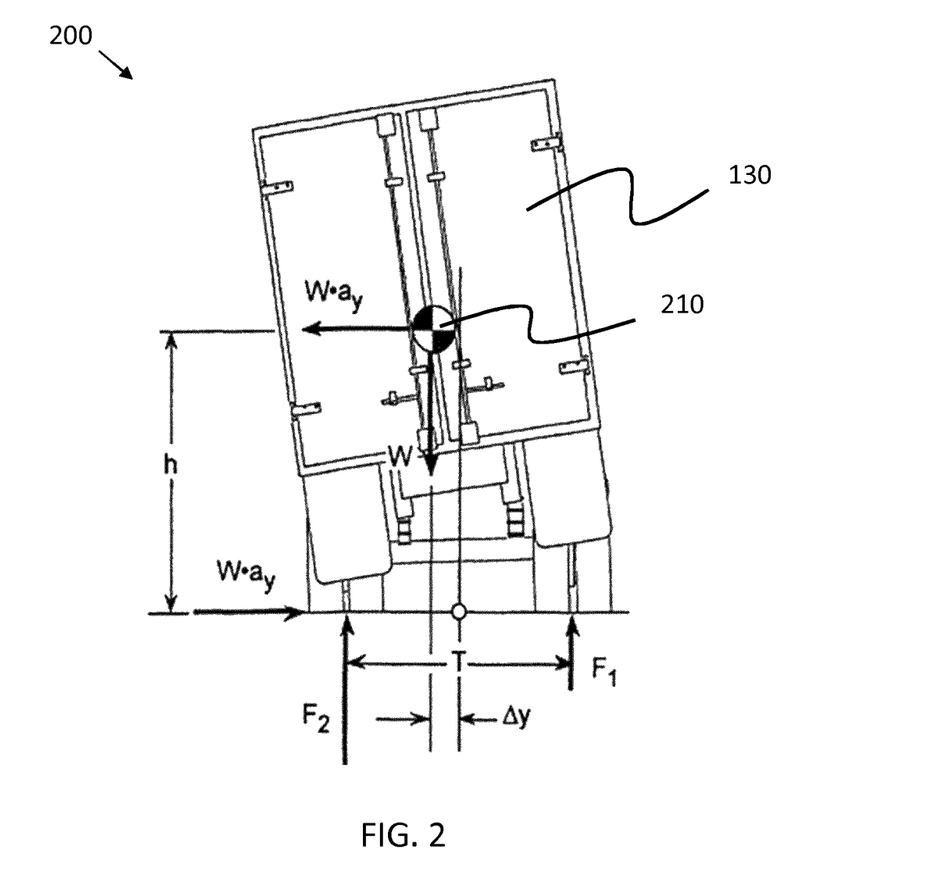
FIG. 2 illustrates example forces acting on a vehicle.

It is desired to know the mass properties of the vehicle 100, such as center of gravity (COG) location (210), and mass distribution in general. This is at least in part because the mass properties influence mechanical properties of the vehicle such as stability and roll-over properties. For instance, roll-over thresholds are strongly influenced by COG height.

Inertia properties of the vehicle 100 are also of interest and can be inferred from the mass properties of the vehicle. Inertia will be discussed in more detail below in connection to Steiner's theorem, also known as the parallel axis theorem.

More accurate information related to the mass and inertia properties of the vehicle can also be used to improve stability control interventions by, e.g., autonomous or semi-autonomous systems such as advanced automatic driver assistance systems (ADAS). This is because the expected dynamics of the vehicle can be predicted with more accuracy if the predictions are based on accurate mass property information compared to if the dynamics are determined from less accurate and roughly estimated mass property data. Consequently, by means of the herein disclosed techniques, not only can speed-limits be determined to prevent roll over, jackknifing, and the like, but stability control and/or general motion controllers can better predict and control the motion of the vehicle, which is an advantage.

A more detailed discussion on vehicle stability and dynamics will be given in connection to FIG. 2 below.

The vehicle 100 comprises a sensor unit 110 arranged to register one or more properties of cargo units 120 entering the vehicle. The registered properties are related to the mass of the cargo unit. For instance, the sensor is in some examples arranged to detect cargo unit dimensions and obtain an estimate of the cargo unit weight.

The sensor unit 110 is also arranged to estimate a location of the cargo unit in the vehicle. Knowing the cargo unit mass, dimensions, and location, an impact on the overall COG of the vehicle by the cargo unit 120 can be determined. This way, mass properties of the vehicle 100 can be determined in a robust and efficient manner.

The COG of a collection of masses is the point where all the weight of the object can be considered to be concentrated. If (Xcg, Ycg) are the coordinates of the COG of a collection of point masses m1, m2, etc, located at coordinates (x1, y1), (x2, y2), respectively, then:

$$(m1+m2+ \ldots )*g*Xcg=m1*g*x1+m2*g*x2+ \ldots,$$
and $$(m1+m2+ \ldots )*g*Ycg=m1*g*y1+m2*g*y2+ \ldots,$$
where g represents gravity. Similar equations hold for a three dimensional example.

The torque about the origin would be the same if the entire weight acted through the center of gravity instead of acting through the individual masses. Solving for, e.g., the x-coordinate of the center of gravity results in a weighted sum where masses are weighted by respective coordinates, and where the sum is normalized by the total mass.

In general, herein vehicle mass properties may comprise any of vehicle total cargo mass, vehicle mass spatial distribution, vehicle center of gravity, a center of mass height, a center of mass lateral position, and a center of mass longitudinal position. It is appreciated that different maneuvers and driving scenarios require different mass properties to determine safe driving limits and the like.

Figure 3:
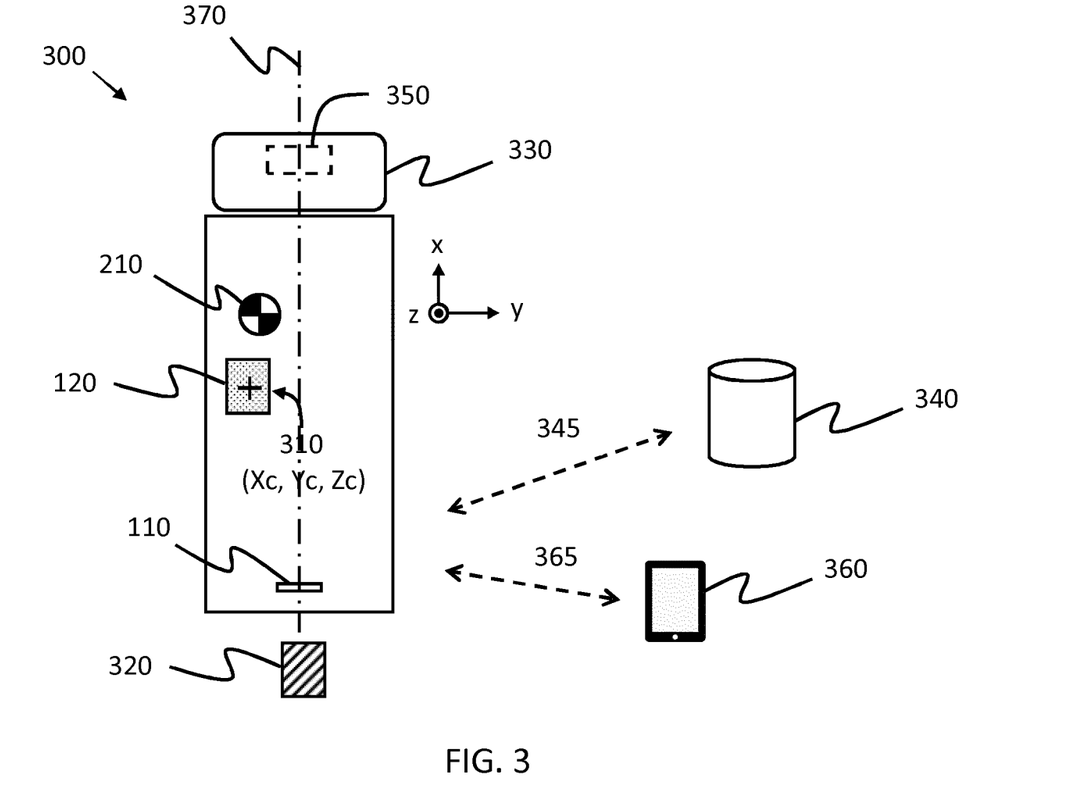
FIG. 3 illustrates a top view of a vehicle for cargo transport.

Notably, the sensor unit 110 is arranged separated from the door 130 of the land-based cargo transport vehicle 100, 300, i.e., the sensor unit is not attached to the door 130, but to, e.g., the roof or walls of the vehicle 100. This means that the registering of cargo properties, and the estimating of cargo location can be performed during loading of the vehicle, which is an advantage. A sensor unit arranged on the door would most likely not be effective during loading and unloading of the vehicle, sine the door is then opened which displaces the sensor.

Once the mass properties of the vehicle have been determined, it becomes possible to derive, e.g., limiting speeds for a truck and trailer combination when negotiating curves and doing rapid maneuvers. Some example details of this type of determination will be given in connection to FIG. 2 below.

Based on the estimated mass properties, it is also possible to determine yaw inertia values associated with the vehicle 100. This type of information is useful in, e.g., yaw rate control systems and stability control systems where control can be based on the determined inertia parameters associated with the vehicle 100.

FIG. 2 schematically illustrates forces acting on a vehicle 200 in a steady turn operation. In FIG. 2, $a_y$ is lateral acceleration, $F_i$ are vertical tire loads (i=1, 2), h is the height of the COG, T is the track width, W is the weight of the vehicle, and $\Delta y$ is the lateral motion of the COG relative to the track. The COG of the vehicle is indicated by a checkered dot 210. This COG varies with cargo. For instance, in case a heavy crate is located on the right hand side of the vehicle cargo area, the COG will shift to the right by some amount. If a high pile of heavy cargo items is placed in the vehicle, the COG will shift upwards, and so on.

A somewhat simplified equilibrium equation for roll moment about a point on the ground at the center of the track is $W*h*a_y=(F_2-F_1)*T/2-W*\Delta y$. From this equation, setting $F_2=W$ and $F_1=0$, it is possible to find an approximation of the maximum allowable lateral acceleration, $a_{y,max}=T*h/2$. From this maximum allowable lateral acceleration, an estimate of the maximum velocity allowable can be derived as; $a_y=v_{x,max}^2/R$, or $v_{x,max}$sqrt($a_{y,max}*R$), where $v_{x,max}$ is the maximum allowable velocity, R is a turn radius, and sqrt( ) represents the square root operation.

It is appreciated that this is a rough estimation based on a number of assumptions, the skilled person realizes that more advanced calculations can be performed with a reduced number of assumptions in order to arrive at a more accurate result. Such calculations based on mass properties of a vehicle are known and will not be discussed in more detail here. The calculations may be performed in real-time as the vehicle moves or they can be performed off-line, resulting in a number of rules defining, e.g., speed limits in dependence of cargo loads.

Vehicle properties such as maximum allowable lateral acceleration, maximum velocity for a given turn radius R, and the like are dynamic properties which can be reported to a vehicle control system for improved vehicle control. This is especially important if the vehicle is an autonomous vehicle or a semi-autonomous vehicle where no driver is present to make corrections to, e.g., vehicle velocity during maneuvers. Vehicle static properties may also be of interest, for instance, it may be of interest to know at what level of banked roadside that parking is safe and where vehicle roll-over is not a risk. Consequently, the techniques presented herein may comprise determining one or more vehicle dynamic properties and/or vehicle static properties based on the determined vehicle mass property.

In general, vehicle dynamic properties of interest may comprise any of; a moment of inertia of cargo and/or vehicle in yaw direction, a moment of inertia of cargo and/or vehicle in roll direction, a moment of inertia of cargo and/or vehicle in the pitch direction, and a limiting speed for a vehicle when negotiating a curve and/or executing a rapid maneuver. Also, a vehicle static property may comprise any of; a static rollover angle threshold, a total vehicle mass value, and an expected axle load.

Vehicle dynamic and static properties may also comprise a vehicle stability value. This value may, e.g., be associated with a maximum slope angle at which the vehicle can be parked on a banked surface without risking tipping over or shifting the cargo. The vehicle stability value may also relate to a property of the vehicle indicating a dynamic stability relative to some baseline value. For instance, as mentioned above, stability control and/or general motion controllers can better predict and control the motion of the vehicle based on the determined stability values of the vehicle, which is an advantage. Vehicle stability values may be associated with vehicle stability control by autonomous or semi-autonomous systems, such as advanced ADAS.

For example, a suspension or fifth wheel damping can be controlled based on the determined stability value in order to adjust overall vehicle stability properties based on the determined mass properties.

Inertia properties of the vehicle 100, 300 may as noted above be of interest in addition to the mass properties of the vehicle. Inertia properties comprise both moments of inertia and products of inertia, which together with angular velocity determines angular momentum, i.e., $$\begin{pmatrix} H_{Gx} \\ H_{Gy} \\ H_{Gz} \end{pmatrix} = \begin{pmatrix} I_{xx} & -I_{xy} & -I_{xz} \\ -I_{yx} & I_{yy} & -I_{yz} \\ -I_{zx} & I_{zy} & I_{zz} \end{pmatrix} \begin{pmatrix} \omega_x \\ \omega_y \\ \omega_z \end{pmatrix},$$

where $H_{Gx}$, $H_{Gy}$, $H_{Gz}$ are the angular momentums, and $\omega_x$, $\omega_y$, $\omega_z$ are the angular velocities. Depending on the coordinate reference system used, $I_{zz}$ is the yaw inertia of the trailer, which can be used in, e.g., yaw control for preventing jackknife swing out. $I_{xx}$ is the roll inertia of the trailer, which gives an idea of the eigen period of the trailer. $I_{yy}$ is the pitch inertia of the trailer, this value may be of use in, e.g., vehicle motion control.

The inertia values for a trailer or a trailer and tractor combination can be calculated based on, e.g., Steiner's theorem, also known as the parallel axis theorem, and as the Huygens-Steiner theorem. It can be used to determine the mass moment of inertia or the second moment of area of a rigid body about any axis, given the body's moment of inertia about a parallel axis through the object's center of gravity and the perpendicular distance between the axes.

Consequently, when the mass distribution of a rigid body is known, one can calculate inertia properties, such as the moments of inertia $I_{xx}$, $I_{yy}$, $I_{zz}$, and also the products of inertia by using Steiner's theorem. Schematically, Steiner's theorem gives the moment of inertia matrix for n particles with masses $m_i$ at positions $r_i$ relative to some reference point S as $$\begin{pmatrix} I_{xx} & -I_{xy} & -I_{xz} \\ -I_{yx} & I_{yy} & -I_{yz} \\ -I_{zx} & I_{zy} & I_{zz} \end{pmatrix} = -\sum_{i=1}^{n} m_i [r_i - S][r_i - S],$$

where $[r_i-S]$ is the skew-symmetric matrix that performs the cross product $[r_i-S]y=(r_i-S)\times y$. Steiner's theorem and its use for determining inertia is known in general and will not be discussed in more detail herein.

It is assumed that mass properties of the empty trailer and empty tractor unit are known, as these can be measured or determined prior to loading the vehicle.

It is appreciated that having knowledge of specific moments of inertia properties for individual pieces of cargo can be used to further refine the determined vehicle mass properties. This way the parallel axis theorem can be used fully accounting for contributions to the vehicle overall mass properties from the separate cargo units one by one. Either inertia properties for specific cargo items are registered, perhaps downloaded from the remote server 340, or the inertia properties of specific cargo items are more roughly estimated based on, e.g., the dimensions of the cargo unit and its mass, assuming the weight of the piece of cargo is distributed evenly over its volume.

FIG. 3 shows an example top view of a vehicle 300. The vehicle 300 is a trailer vehicle with a tractor unit 330 for pulling the trailer. The vehicle comprises the sensor unit 110 arranged away from the doors of the cargo area. A first cargo unit 120 has been placed in the vehicle at a location 310 given by coordinates Xc, Yc, Zc. Due to the first cargo unit 120, the COG location of the vehicle 300 has been shifted to the left compared to a vehicle center axis 370.

A second cargo unit 320 is about to enter the vehicle. Thus, mass properties of the vehicle 300 will be updated according to the present teachings as the second cargo unit enters the vehicle. If the second cargo unit is also placed on the left-hand side of the vehicle close, the COG location 210 will shift even more to the left. If the second cargo unit is instead placed on the opposite side of the vehicle center axis 37, the COG location 210 will likely shift some distance to the right.

This updating procedure can, for example, comprise using the sensor 110 to detect the type of cargo unit entering the cargo area, and where it is placed. The vehicle mass properties can then be updated based on the sensed information. This process is then repeated until all cargo units have entered the cargo area.

Cargo unit volume and mass are for example given either by automatic system reading of box or data transmitted between logistic system and vehicle combination trailer system. Information about cargo units can also be downloaded 345 from a remote server 340, or manually configured 360 via wireless or wireline link 365. For example, the second cargo unit may be identified by the sensor 110 or by manual input 360 as belonging to a certain logistics company. The system then accesses a remote server 340 belonging to that logistics company in order to download cargo unit dimensions and weight. The sensor 110 then detects where in the cargo hold the second cargo unit is placed, whereupon the mass properties of the vehicle can be updated as discussed above.

The location estimation and general signal processing involved in the disclosed functions and methods may according to some aspects be performed by the sensor unit 110 itself. However, parts of the signal processing functionality may also be located in a control unit 350. This control unit 350 is here shown arranged in the front part of the truck 330, where the control unit may constitute a module in a vehicle electronic control unit (ECU).

To summarize, FIGS. 1 and 3 schematically illustrate a system for determining a mass property of a land-based cargo transport vehicle 100, 300. The disclosed technique comprises registering one or more properties of a cargo unit 120, 320 entering the vehicle, e.g., by the sensor unit 110 or manually 360, wherein at least one of the properties is related to a mass of the cargo unit. A location 310 of the cargo unit in the vehicle is then estimated. Based on the cargo mass and location, a mass property of the vehicle 100, 300 is then determined.

Figure 4A:
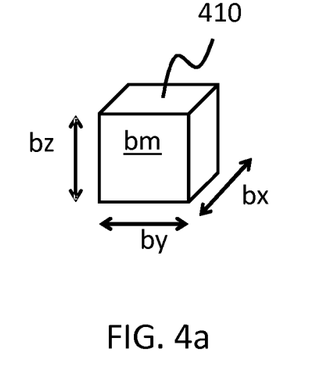
FIGS. 4a,4b show example cargo units.
Figure 4B:
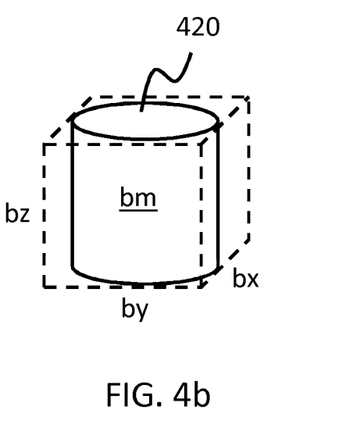

FIGS. 4a and 4b illustrate two different examples of determining cargo unit dimensions. Dimensions of a rectangular cargo unit 410 may be specified using length bx, width by, and height bz parameters. Dimensions of more irregular sized cargo units 420 may be specified, e.g., as a rectangular bounding volume, as illustrated in FIG. 4b.

A number of different techniques can be used for detecting where the cargo unit is placed in the cargo transport vehicle by the sensor unit 110. For instance, the sensor unit may comprise any of a vision sensor, a radar sensor, and a lidar sensor.

A vision sensor can be arranged to detect a background image prior to loading a cargo unit. The background image can then be compared to an image taken after the cargo unit has been loaded, whereupon differences between the two images can be used to locate the newly loaded cargo unit.

Radar sensors may be used in a manner similar to vision sensors based on differences before and after loading. However, cargo units can also be equipped with radar transponders. These transponders can be located by a radar in the cargo area and thus positioning relative to the radar transceiver. Each cargo unit can be assigned a unique code or identification signal allowing the radar transponder to be identified and separated from other radar transponder signals.

Lidar sensors can be used in a manner similar as vision sensors to detect location of newly loaded cargo units based on differences between background images and images obtained after loading.

It is appreciated that the sensor unit 110 can also be arranged to detect a volume of cargo comprised in the cargo transport vehicle using any of a vision sensor, a radar sensor, and a lidar sensor. For instance, vision sensors can be used to determine how much available space that is available in the cargo area of the vehicle, which is an advantage. The sensor units disclosed herein can thus also be used to assess an amount of free or occupied space available in the vehicle, and to determine if an additional cargo unit can fit in the cargo area based on the estimated space and on size of the cargo unit.

In addition, an array of photodiodes and/or an array of pressure sensors can be used to estimate where in the vehicle each cargo unit is placed. Also, an RFID array, ultrawideband array, or the like, with receivers arranged around the perimeter of a cargo hold of the vehicle can be used to position cargo units in the vehicle. These types of positioning systems are active positioning systems based on the cargo unit responding to an interrogating signal. The response signal is then used to locate the cargo unit.

It is appreciated that cargo units may be loaded and unloaded from the vehicle as the vehicle travels along a route. I.e., it may not always be so that all cargo is unloaded at once from the vehicle. In such cases, it is advisable to also register properties of cargo units leaving the vehicle and associate the unloaded cargo units with respective locations in the vehicle. This way, vehicle mass properties such as COG and the like can be kept up to date at all times. The processes and functions for registering cargo units leaving the vehicle are similar to the above disclosed processes and functions for registering cargo units entering the vehicle.

One particularly efficient way to obtain cargo unit data, i.e., mass properties and the like, is to identify the different cargo units and then download information from a remote server 340, such as a logistics server or data resource belonging to a transportation organization. The identification can be performed in different ways depending on circumstances, however, it may be advantageous to employ known techniques such as bar-.code scanning and the like. More advanced identification techniques include radio frequency techniques, radar techniques, and the like. Manual input is of course also an option. Thus, according to some aspects, the registering comprises associating an identity with the cargo unit 120, 320 based on any of; bar-code scanning, radio frequency identification, RFID, an infra-red label, a radar transponder, and manual input 260, and obtaining one or more properties of the cargo unit from a logistics database based on the identification.

Some vehicles transport cargo along known routes, where it is known with high probability which type of cargo that will enter and leave the cargo transport vehicle at the different stops along the route.

Figure 5:
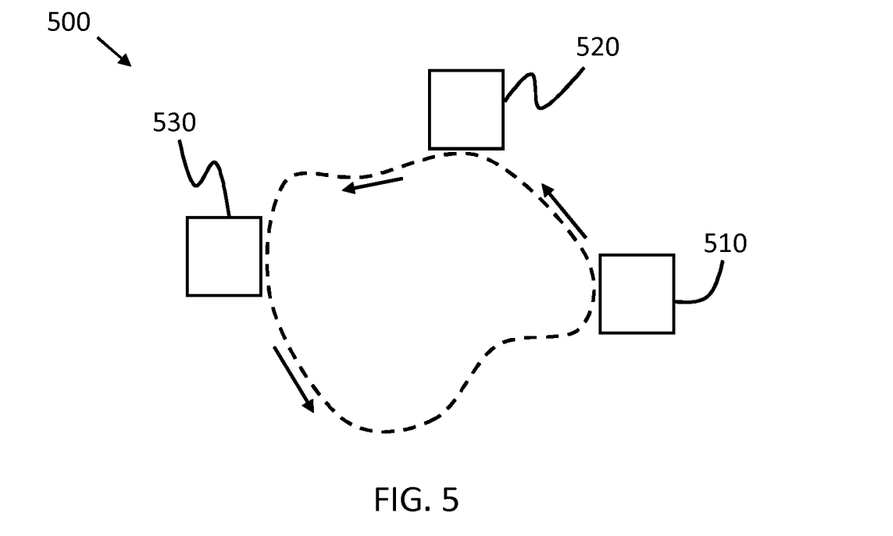
FIG. 5 schematically illustrates a cargo transport route.

FIG. 5 illustrates such as route 500. This route has three stops 510, 520, and 530. Knowing in advance which cargo will be loaded and unloaded can be used in the determining of the vehicle mass property. In other words, according to some aspects, the registering of cargo unit properties comprises obtaining pre-configured cargo unit type data and/or pre-configured cargo unit mass data.

According to some aspects, the registering of cargo unit properties entering the vehicle comprises estimating a cargo type associated with the cargo unit based on a location of the cargo transport vehicle, and/or based on pre-configured route information 500 associated with the cargo transport vehicle.

Cargo unit type can also be automatically recognized by the sensor unit 110, using artificial intelligence algorithms or the like. Such object recognition algorithms are known and will not be discussed in more detail herein. Input to such cargo unit recognition algorithms may come from, e.g., vision sensors, X-ray sensors, or radar sensors. These sensors may be co-located with sensor unit 110, or they make be separate sensor units.

The techniques disclosed herein are also applicable to detecting shifts in the cargo load, by the sensor unit 110. Thus, according to some aspects, the sensor system can be arranged to detect a re-location or shift of one or more cargo units in the land-based cargo transport vehicle, and to update the mass property of the vehicle based on the re-location or shift.

Figure 6:
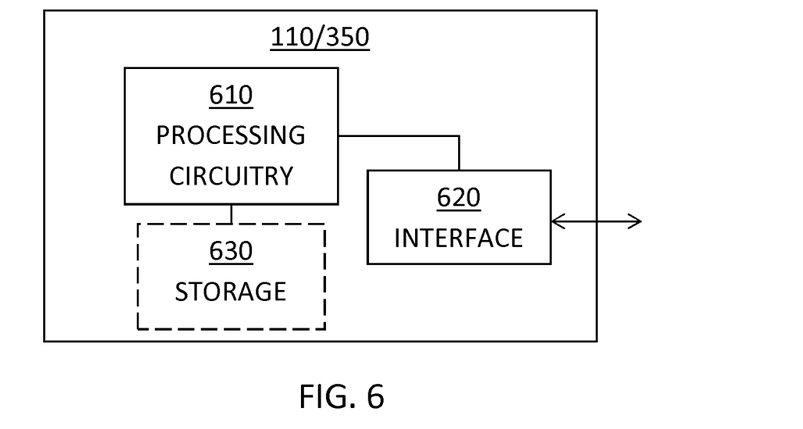
FIG. 6 schematically illustrates a control unit.

FIG. 6 schematically illustrates, in terms of a number of functional units, the components of a control unit 350 or sensor unit 110 according to embodiments of the discussions herein. Processing circuitry 610 is provided using any combination of one or more of a suitable central processing unit CPU, multiprocessor, microcontroller, digital signal processor DSP, etc., capable of executing software instructions stored in a computer program product, e.g. in the form of a storage medium 630. The processing circuitry 610 may further be provided as at least one application specific integrated circuit ASIC, or field programmable gate array FPGA.

Particularly, the processing circuitry 610 is configured to cause the control unit 350 or sensor unit 110 to perform a set of operations, or steps, such as the methods discussed in connection to FIG. 8. For example, the storage medium 630 may store the set of operations, and the processing circuitry 610 may be configured to retrieve the set of operations from the storage medium 630 to cause the control unit 350 or sensor unit 110 to perform the set of operations. The set of operations may be provided as a set of executable instructions. Thus, the processing circuitry 610 is thereby arranged to execute methods as herein disclosed.

The storage medium 630 may also comprise persistent storage, which, for example, can be any single one or combination of magnetic memory, optical memory, solid state memory or even remotely mounted memory.

The control unit 350 or sensor unit 110 may further comprise an interface 620 for communications with at least one external device, such as the antenna array comprising the phase controllers and the mechanically rotatable base plate. As such the interface 620 may comprise one or more transmitters and receivers, comprising analogue and digital components and a suitable number of ports for wireline or wireless communication.

The processing circuitry 610 controls the general operation of the control unit 350 or sensor unit 110, e.g., by sending data and control signals to the interface 620 and the storage medium 630, by receiving data and reports from the interface 620, and by retrieving data and instructions from the storage medium 630. Other components, as well as the related functionality, of the control node are omitted in order not to obscure the concepts presented herein.

According to one example, FIG. 6 illustrates a sensor unit 110 for determining a mass property of a land-based cargo transport vehicle 100, 200, 300. Notably, the sensor unit is arranged to register one or more properties of a cargo unit entering the cargo transport vehicle, wherein at least one property is related to a mass of the cargo unit, the sensor unit being arranged to estimate a location of the cargo unit in the trailer, and to transmit the registered property and the estimated location to a control unit.

According to another example, FIG. 6 illustrates a control unit 350 for determining a mass property of a land-based cargo transport vehicle 100, 200, 300. Notably, the control unit is arranged to receive data related to a cargo unit entering the vehicle, wherein the data comprises at least one property related to a mass of the cargo unit, to receive an estimated location of the cargo unit in the vehicle, and to determine the mass property of the cargo transport vehicle based on the one or more properties of the cargo unit and on the estimated location of the cargo unit in the trailer.

Figure 7:
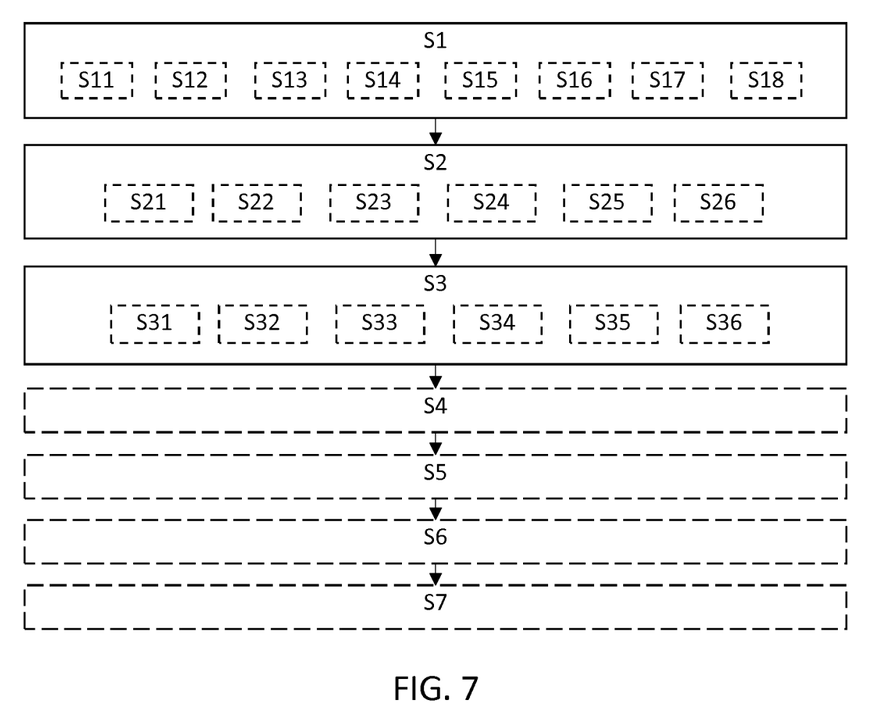
FIG. 7 is a flow chart illustrating methods.

FIG. 7 is a flow chart illustrating methods disclosed herein and which summarize the above discussions. The methods are performed by the sensor unit 110, by the control unit 350, or by a combination of sensor unit and control unit. There is illustrated a method for determining a mass property of a land-based cargo transport vehicle 100, 200, 300. The method comprises registering S1 one or more properties of a cargo unit 120, 320 entering the vehicle, wherein at least one of the properties is related to a mass of the cargo unit, estimating S2 a location Xc, Yc, Zc, of the cargo unit in the vehicle, and determining S3 the mass property of the vehicle based on the one or more registered cargo unit properties and on the estimated location of the cargo unit.

According to aspects, the mass property comprises any of; a vehicle total cargo mass S31, a vehicle mass spatial distribution S32, a center of gravity, COG, location S33, a center of mass height S34, a center of mass lateral position S35, and a center of mass longitudinal position S36.

According to aspects, the method further comprises determining S4 a vehicle dynamic property and/or a vehicle static property based on the determined vehicle mass property.

According to aspects, the vehicle dynamic property comprises any of; a moment of inertia of cargo and/or vehicle in yaw direction, a moment of inertia of cargo and/or vehicle in roll direction, a moment of inertia of cargo and/or vehicle in the pitch direction, and a limiting speed for a vehicle when negotiating a curve and/or executing a rapid maneuver.

According to aspects, the vehicle static property comprises any of; a static rollover angle threshold, a total vehicle mass value, and an expected axle load.

According to aspects, the registering and/or the estimating comprises estimating S11 physical dimensions bx, by, bz and mass bm of the cargo unit 120, 320.

According to aspects, the registering and/or the estimating comprises registering S12 and/or estimating S21 by a sensor unit 110 arranged separated from a door of the land-based cargo transport vehicle, whereby the registering and/or the estimating can be performed during loading of the vehicle.

According to aspects, the method comprises registering S13 one or more properties of a cargo unit leaving the vehicle, and associating S22 the leaving cargo unit with a respective location in the vehicle Xc, Yc, Zc.

According to aspects, the registering comprises associating an identity S14 with the cargo unit 120, 320 based on any of; bar-code scanning, radio frequency identification, RFID, an infra-red label, a radar transponder, and manual input 260, and obtaining S15 one or more properties of the cargo unit from a logistics database 240 based on the identification.

According to aspects, the registering comprises obtaining S16 pre-configured cargo unit type data and/or pre-configured cargo unit mass data.

According to aspects, the registering comprises recognizing S17 a cargo type associated with the cargo unit 120, 320 based on any of a vision sensor, an X-ray sensor, and a radar sensor.

According to aspects, the registering comprises estimating S18 a cargo type associated with the cargo unit 120, 320 based on a location of the cargo transport vehicle, and/or based on pre-configured route information 300 associated with the cargo transport vehicle.

According to aspects, the method comprises detecting S5 a re-location or shift of one or more cargo units in the land-based cargo transport vehicle and updating S6 the mass property based on the re-location or shift.

According to aspects, the estimating comprises detecting S23 where the cargo unit is placed in the cargo transport vehicle Xc, Yc, Zc using any of a vision sensor, a radar sensor, and a lidar sensor.

According to aspects, the estimating comprises detecting S24 a volume of cargo comprised in the cargo transport vehicle using any of a vision sensor, a radar sensor, and a lidar sensor.

According to aspects, the estimating comprises detecting S25 where the cargo unit is placed in the cargo transport vehicle using an array of photodiodes and/or an array of pressure sensors.

According to aspects, the estimating comprises detecting S26 where the cargo unit is placed in the cargo transport vehicle using an RFID array, ultrawideband array, or the like, with receivers arranged around the perimeter of a cargo hold of the vehicle.

According to aspects, the method comprises assessing S7 an amount of free or occupied space available in the vehicle and determining if an additional cargo unit 220 can fit in the cargo area based on the estimated space and on size of the cargo unit.

Figure 8:
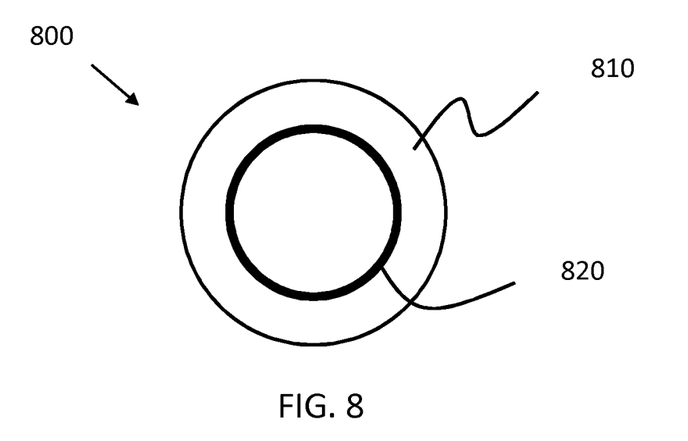
FIG. 8 shows an example computer program product.

FIG. 8 illustrates a computer readable medium 810 carrying a computer program comprising program code means 820 for performing the methods illustrated in FIG. 7, when said program product is run on a computer. The computer

The invention claimed is:

1. A computer implemented method of a heavy-duty vehicle, comprising:
registering, with a sensor, one or more properties of a cargo unit entering the heavy-duty vehicle, wherein at least one of the properties is related to a mass of the cargo unit,
estimating, with a computer, a location of the cargo unit in the vehicle,
determining, with the computer, a mass property of the vehicle based on the one or more registered cargo unit properties and on the estimated location of the cargo unit, wherein the mass property of the vehicle comprises a center of mass lateral position;
determining, with the computer, a vehicle dynamic property based on the determined vehicle mass property, wherein the vehicle dynamic property comprises a limiting speed for a vehicle when negotiating a curve;
providing the vehicle dynamic property to a vehicle control system; and
controlling the vehicle as it is moving via the vehicle control system based on the vehicle dynamic property.

2. The method according to claim 1, wherein the mass property of the vehicle comprises any of; a vehicle total cargo mass, a vehicle mass spatial distribution, a center of gravity, COG, a center of mass height, a center of mass lateral position, and a center of mass longitudinal position.

3. The method according to claim 1, wherein the vehicle dynamic property further comprises any of; a moment of inertia of vehicle in the pitch direction, and steady state rollover lateral acceleration limit.

4. The method according to claim 1, wherein the registering and/or the estimating comprises estimating physical dimensions and mass of the cargo unit.

5. The method according to claim 1, wherein the registering and/or the estimating comprises registering and/or estimating by the sensor arranged separated from a door of the heavy-duty vehicle, whereby the registering and/or the estimating can be performed during loading of the vehicle.

6. The method according to claim 1, comprising registering, with the sensor, one or more properties of a cargo unit leaving the vehicle, and associating the unloaded cargo unit with a respective location in the vehicle.

7. The method according to claim 1, wherein the registering comprises associating an identity with the cargo unit based on any of; bar-code scanning, radio frequency identification, RFID, an infra-red label, a radar transponder, and manual input, and obtaining one or more properties of the cargo unit from a logistics database based on the identification.

8. The method according to claim 1, wherein the registering comprises obtaining pre-configured cargo unit type data and/or pre-configured cargo unit mass data.

9. The method according to claim 1, wherein the registering comprises recognizing a cargo type associated with the cargo unit based on any of a vision sensor, an X-ray sensor, and a radar sensor.

10. The method according to claim 1, wherein the registering comprises estimating a cargo type associated with the cargo unit based on a location of the cargo transport vehicle, and/or based on pre-configured route information associated with the cargo transport vehicle.

11. The method according to claim 1, comprising detecting with the sensor a re-location or shift of one or more cargo units in the heavy-duty vehicle, and updating the mass property based on the re-location or shift.

12. The method according to claim 1, wherein the estimating comprises detecting where the cargo unit is placed in the cargo transport vehicle using any of a vision sensor, a radar sensor, and a lidar sensor.

13. The method according to claim 1, wherein the estimating comprises detecting a volume of cargo comprised in the cargo transport vehicle using any of a vision sensor, a radar sensor, and a lidar sensor.

14. The method according to claim 1, wherein the estimating comprises detecting where the cargo unit is placed in the cargo transport vehicle using an array of photodiodes and/or an array of pressure sensors.

15. The method according to claim 1, wherein the estimating comprises detecting where the cargo unit is placed in the cargo transport vehicle using a radio frequency identification, RFID, antenna array, a radio frequency transmission antenna array, or an ultrawideband transmission antenna array, with transceivers or receivers arranged around the perimeter of a cargo hold of the vehicle.

16. The method according to claim 1, comprising assessing an amount of free or occupied space available in the vehicle, and determining if an additional cargo unit can fit in the cargo area based on the estimated space and on size of the cargo unit.

17. The method according to claim 1, wherein the computer includes a sensor unit and a control unit.

18. The method according to claim 1, further comprising determining a vehicle static property based on the determined vehicle mass property.

19. The method according to claim 18, wherein the vehicle static property comprises any of; a static rollover angle threshold, a vehicle stability value, and an expected axle load.

20. The method according to claim 1, wherein the vehicle dynamic property comprises any of: a moment of inertia of cargo and/or vehicle in yaw direction, a moment of inertia of cargo and/or vehicle in roll direction, and a moment of inertia of cargo in the pitch direction.

21. A non-transitory computer readable medium carrying a computer program comprising program code for performing the steps of claim 1, when said program code is run on a computer.

22. A control unit for determining a mass property of a heavy-duty vehicle, wherein the control unit is arranged to receive data related to a cargo unit entering the vehicle, wherein the data comprises at least one property related to a mass of the cargo unit, and to receive an estimated location of the cargo unit in the vehicle, and also to determine the mass property of the cargo transport vehicle based on the one or more properties of the cargo unit and on the estimated location of the cargo unit in the vehicle wherein the mass property of the vehicle comprises a center of mass lateral position, determine a vehicle dynamic property based on the determined vehicle mass property, and provide the vehicle dynamic property to a vehicle control system for controlling the vehicle as it is moving via the vehicle control system based on the vehicle dynamic property, wherein the vehicle dynamic property a limiting speed for a vehicle when negotiating a curve, and controlling the vehicle as it is moving via the vehicle control system based on the vehicle dynamic property.

23. A system for determining a mass property of a heavy-duty vehicle, comprising a sensor unit and the control unit of claim 22.

24. A heavy-duty vehicle comprising the system according to claim 23.

\* \* \* \* \*